(12) United States Patent
Seki et al.

(10) Patent No.: US 7,228,733 B2
(45) Date of Patent: Jun. 12, 2007

(54) FLUID DETECTION DEVICE

(75) Inventors: Kazuo Seki, Tokyo (JP); Yasuharu Ooishi, Tokyo (JP)

(73) Assignee: Yamatake Corporation, Tokyo (JP)

( * ) Notice: Subject to any disclaimer, the term of this patent is extended or adjusted under 35 U.S.C. 154(b) by 119 days.

(21) Appl. No.: 10/533,391

(22) PCT Filed: Nov. 17, 2003

(86) PCT No.: PCT/JP03/14579

§ 371 (c)(1),
(2), (4) Date: Apr. 28, 2005

(87) PCT Pub. No.: WO2004/046659

PCT Pub. Date: Jun. 3, 2004

(65) Prior Publication Data

US 2006/0059985 A1 Mar. 23, 2006

(30) Foreign Application Priority Data

Nov. 18, 2002 (JP) .............................. 2002-333411

(51) Int. Cl.
*G01F 1/68* (2006.01)
(52) U.S. Cl. .................................... 73/202.5
(58) Field of Classification Search .............. 73/202.5, 73/204.11, 204.13, 204.21, 204.19, 204.24
See application file for complete search history.

(56) References Cited

U.S. PATENT DOCUMENTS 3,604,263 A * 9/1971 Auphan et al. .......... 73/204.13
4,381,668 A * 5/1983 Sato et al. .................. 73/202.5
RE31,570 E * 5/1984 Drexel ....................... 73/202.5

FOREIGN PATENT DOCUMENTS

| JP | 62-64914 A | 3/1987 |
|---|---|---|
| JP | 3-235024 A | 10/1991 |
| JP | 4-230808 A | 8/1992 |
| JP | 8-507379 A | 8/1996 |
| JP | 2611085 B2 | 2/1997 |
| JP | 10-307047 A | 11/1998 |
| JP | 2001-4420 A | 1/2001 |
| JP | 2001-174305 A | 6/2001 |

* cited by examiner

*Primary Examiner*—Jewel Thompson
(74) *Attorney, Agent, or Firm*—Frishauf, Holtz, Goodman & Chick, P.C.

(57) ABSTRACT

One or a plurality of branch paths (3) having opening end portions (2) formed in the vicinity of an inner wall surface of a main path (1) through which a fluid flows so as to point the upstream or downstream side of the main path, and causing part of the fluid running in the vicinity of the inner wall surface of the main path to flow therethrough via the opening end portions, to thereby detect flow rates of the fluids running through the branch paths by using a thermal flow sensor (4). Preferably, a plurality of opening end portions (2*a*) pointed toward the upstream side or a plurality of opening end portions (2*b*) pointed toward the downstream side are arranged at regular intervals along the path cross section of the main path around the axis of the main path, to thereby measure a fluid flow with high accuracy.

20 Claims, 7 Drawing Sheets

FLUID DETECTION DEVICE

This application is a U.S. National Phase Application under 35 USC 371 of International Application PCT/JP03/14579 filed Nov. 17, 2003.

TECHNICAL FIELD

The present invention relates to a fluid detecting device suitable for measuring, for example, the flow rate of fuel gas or combustion air that is supplied to a gas burner.

BACKGROUND ART

In recent years, low-NOx high-efficiency combustion, such as fully-premixed combustion, has been promoted, and it is required to accurately control the supply amount of fuel gas and air (hereinafter referred to as gas) to be supplied to, for example, a gas burner or a gas engine. To achieve such control, it is important to detect the flow rate of the gas (that means fuel gas or combustion air) supplied to a gas burner and the like with high accuracy.

For a flow detector for detecting the flow rate of gas (fluid), for example, Unexamined Japanese Patent Application No. 4-230808 discloses one in which a pair of temperature sensors arranged with/without a heater therebetween in the gas-flowing direction are provided onto the inner wall of a main path to be exposed. This thermal flowmeter detects temperature distribution that is changed by the flow velocity of the gas by a temperature difference detected by the temperature sensors, to thereby measure the mass flow rate of the gas according to the temperature difference. In the thermal flowmeter, however, a heater and the temperature sensors are brought into direct contact with the gas running through the main path. Therefore, the thermal flowmeter is not suitable for the flow rate measurement of the gas having a high temperature of, for example about 300 degrees centigrade, in respect of heat resistance. Moreover, in the thermal flowmeter, a detection output with respect to an increase in gas flow shows a curved alteration characteristic, so that an area in which the flow and the detection output are considered to be in a proportional relation is narrow. For this reason, if the flow is to be detected in a relatively wide area, calculation for converting the detection output showing the curved alteration characteristic with respect to the flow into a linear alteration characteristic is required.

Disclosed in, for example, Unexamined Japanese Patent Application No. 10-307047 is an orifice-type flowmeter in which an orifice (throttle) is disposed in a path, to thereby detect a gas flow rate by pressure (differential pressure) detected through the orifice. This orifice-type flowmeter is so constructed as to shunt part of the fluid flowing through the main path into a branch path. Therefore, even a high-temperature gas can be detected after being refrigerated in the branch path. On the other hand, in the orifice-type flowmeter, a throttle ratio of the gas path which is obtained by the orifice needs to fall in the range of from about 0.1 to 0.8, which is surely accompanied by pressure loss.

Furthermore, it is necessary that an inflow-side opening end portion of the branch path be disposed on the upper stream side of the orifice, and an outflow-side opening end portion be disposed on the lower stream side separately. As a result, it is certain that the inflow-side opening end portion and the outflow-side opening end portion are positioned apart from each other at some distance in the longitudinal direction. Accordingly, in case that there generates oscillation in the gas flow in the main path due to combustion or the like, the oscillation occasionally cannot be detected by the orifice-type flowmeter. In other words, the orifice-type flowmeter has the disadvantage that oscillation at a specific frequency corresponding to the distance between the inflow-side opening end portion and the outflow-side opening end portion cannot be detected. This phenomenon is attributable to the fact that the pressure of the inflow-side opening end portion and that of the outflow-side opening end portion are equalized, so that there generates no flow in the branch path.

DISCLOSURE OF THE INVENTION

An object of the present invention consists in providing a fluid detecting device that can be constructed such that even if fluid running through a main path is high in temperature, a flow of the fluid can be detected without the influence of the temperature thereof.

Another object of the invention is to provide a fluid detecting device capable of fully minimizing pressure loss and measuring a flow of a fluid, such as fuel gas, with high accuracy with scarcely any influence of the pressure loss.

Another object of the invention is to provide a fluid detecting device capable of setting a relatively wide area in which a flow and detection output are considered to be in a proportional relation.

Another object of the invention is to provide a fluid detecting device in which inflow-side opening end portions and outflow-side opening end portions of branch paths can be arranged close to each other, the device being capable of accurately detecting oscillation of a gas flow, attributable to combustion.

In other words, the invention has been made to accomplish at least one of the above objects.

To achieve the above objects, the invention has been made in light of:

(a) the fact that a fluid flow on a wall surface of a pipe can be considered as a Couette flow when there is no throttle in a path thereof; and (b) the fact that a flow velocity in the vicinity of an inner wall surface of the pipe is in an approximately proportional relation with an average flow rate in the pipe, although a flow velocity in each part of a path cross section formed by the pipe through which fuel gas or the like flows varies depending on a curved shape of the pipe and distance from the wall surface of the pipe.

The fluid detecting device according to the invention is provided with one or a plurality of branch paths each having an opening end portion that is formed in the vicinity of an inner wall surface of the main path so as to point to an upstream or downstream side of the main path in the vicinity of the inner wall surface of the main path through which a fluid runs, and causing part of a fluid flowing in the vicinity of the inner wall surface of the main path to run therethrough via the opening end portions, to thereby detect the flow rates of the fluids that run through the branch paths by using a thermal flow sensor.

With a fluid detecting device thus constructed, it is possible to shunt the fluids into the branch paths without substantially providing a throttle in the main path. Thus, great pressure loss does not occur in the main path. Even if the gas running through the main path is high in temperature, only a small amount thereof is shunted into the branch paths and gives off heat onto the inner wall in the branch paths, thus lowering the gas temperature. This makes it possible to carry out flow detection within heat resistance limits of the thermal flow sensor.

The device is particularly designed such that part of a laminar boundary layer or of a laminar sub-layer flowing in the vicinity of the inner wall surface among the fluid running through the main path is shunted into the branch paths, to thereby detect the flows (part of the laminar boundary layer or of the laminar sub-layer) of the fluids that run through the branch paths. As a result, the area in which the fluid flow and the detection output are considered to be in a proportional relation is wide. It is possible to carry out detection with few error in the laminar boundary layer or in the laminar sub-layer because these layers are hardly influenced by disorder that occurs in the fluid flowing through the main path.

Preferably, opening end portions pointed toward the upstream side of the main path or those pointed toward the downstream side of the main path in the branch paths are arranged at regular intervals along a path cross section around an axis of the main path, to thereby detect the flow rates of the fluids that run through the branch paths.

If the opening end portions of the branch paths are arranged at regular intervals along the path cross section in this manner, for example, even in case that there generates deviation in the flow of the fluid running through the main path due to the curve of the upstream-side path, the deviation can be detected by difference in the flow rates detected in the branch paths. It is also possible to measure an average flow rate of the fluid running through the main path, for example, by averaging the flow rates detected in the branch paths by arithmetic average.

It is also possible that the upstream-side branch paths whose opening end portions are pointed toward the upstream side and the downstream-side branch paths whose opening end portions are pointed toward the downstream side are jointed to each other via a communicating portion that forms one path, and a total flow rate of the fluids running through the branch paths is detected in a lump in the communicating path.

Since the above construction makes it possible to easily detect the total flow rates of the fluids running through the branch paths, for example, even if there generates deviation in the flow of the fluid that runs through the main path, it is possible to average the flow rates of the fluids that flow into the branch paths to perform the flow rate measurement. Consequently, the highly accurate flow rate measurement can be easily carried out without the influence of deviation of the fluid that runs through the main path.

Under the condition that the branch paths are left open at the other end sides, the fluids shunted from the main path into the branch paths may be discharged outside, or to the contrary, the fluids that flow in from the outside via the branch paths may be flowed into the main path. With the above construction, part of the fluid that runs through the main path is discharged outside, or the fluids that flow in from the outside are introduced into the main path. For example, if the fluid is air, no particular problem occurs, and the construction can be simplified.

The device, however, is preferably constructed such that the opening end portions of the branch paths whose opening end portions are pointed toward the upstream side are positioned upstream from the opening end portions of the branch paths whose opening end portions are pointed toward the downstream side, and the other end portions of the branch paths communicate with one another as mentioned, to thereby return the part of the fluid shunted into the branch paths to the main path. This does not cause the problem that is produced in case that the branch paths are open toward a surrounding environment at the other ends thereof, and the flow detection can be carried out while the flow itself is stabilized.

Path resistance of each of the branch paths is made greater than path resistance of the communicating portion, so that even if a flow in any one of the opening end portions is locally changed, an influence on the flow as arithmetic average of the communicating portion can be made relatively small. This minimizes the effects of deviation of flow distribution in the main path.

It is also effective that in addition to the above-mentioned thermal flow sensor, an auxiliary thermal flow sensor having the same specification as the above thermal flow sensor is disposed in a position that does not interfere with the fluids running through the branch paths, and the output of the thermal flow sensor is converted by using the output of the auxiliary thermal flow sensor. The simultaneous use of the auxiliary thermal flow sensor makes it possible to, for example, counteract oscillation transmitted to the fluid and electrical noises transmitted to the thermal flow sensor, thereby further heightening the measurement accuracy.

"Path resistance" here means an approximate proportionality constant between the flow rate of the fluid running through a certain path and differential pressure between both ends of the path. For example, when the differential pressure is fixed, the flow rate is reduced by increasing the path resistance. In general, the smaller the diameter of the path is, or the longer the path is, the greater the path resistance becomes.

With the fluid detecting device according to the invention which is thus constructed, since the fluid flow that is extremely close to the inner wall of the main path is shunted to detect the shunted flows, at least one of the following advantages can be exhibited.

(1) The device can be constructed to be capable of detecting the flow of the fluid running through the path even if the fluid is high in temperature, and constructed such that the pressure loss is extremely small.

(2) The device can be constructed such that the area in which the flow and the detection output are considered to be in a proportional relation is relatively wide.

(3) It is possible to dispose the inflow-side-opening end portions and the respective outflow-side opening end portions of the branch paths close to each other, which enables the accurate detection of flow oscillation of the fluid (gas).

BEST MODE OF CARRYING OUT THE INVENTION

A fluid detecting device according to an embodiment of the present invention will be described below in detail with reference to drawings.

Figure 1:
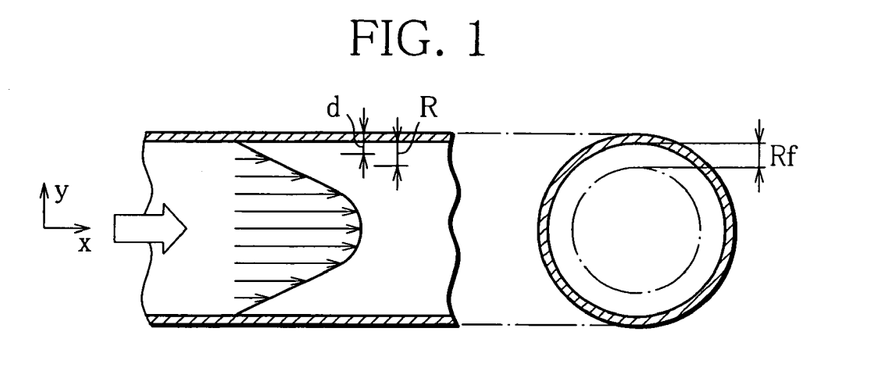
FIG. 1 is a view of distribution of a flow of fluid in a straight path for explaining a flow rate detection principle of a fluid detecting device according to the present invention.
Figure 2:
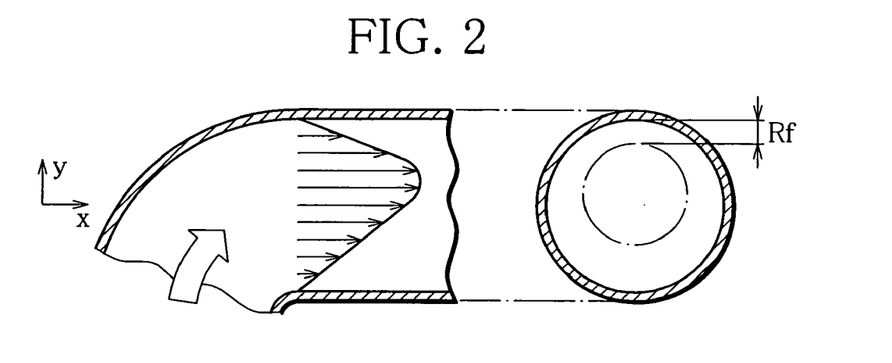
FIG. 2 is a view of distribution of a flow of fluid in a curved path for explaining a flow rate detection principle of the fluid detecting device according to the present invention.

A flow of a fluid running through a pipe whose path cross section is formed in a circular shape is not uniform in each part of the path cross section, and has a certain distribution as shown in FIGS. 1 and 2. To be concrete, due to viscosity of the fluid, the flow is generally rapid in a central portion of the path cross section, and is slow in the vicinity of an inner wall surface of the pipe. Particularly in case that the upstream-side pipe is curved as shown in FIG. 2, the flow is distorted due to the curve of the path, so that there generates deviation in the flow distribution.

A flow velocity in the vicinity of a wall surface of the pipe can be denoted by an equation of a laminar boundary layer shown by a Navier-Stokes equation and a continuity equation. Without a throttle in the path, a flow $\Delta u$ in a position at a distance $d(d\neq0)$ from the wall surface can be considered as a Couette flow, where the flow velocity in the vicinity of the inner wall surface of the pipe is [0]. If a flow velocity in the wall surface (y=0) is [u=0], and a velocity in a boundary condition (y=R) of the Couette flow is [u=U (average flow velocity)], a flow velocity u thereof can be approximate as [u=U/R ·y].

An average flow velocity $u_{ave}$ in the vicinity of the inner wall surface (d≈0) in case that there is deviation in the fluid flow as shown in FIG. 2 can be found as arithmetic average of a flow velocity $U_f$ in the vicinity of the inner wall surface in circumferential parts along the inner wall surface that defines the path cross section, and the following relation is established.

$$U_{ave} \approx \Sigma u_f/n = U\Sigma d/R_f/n$$

where $\Sigma$ represents a summing calculation when a subscript f is (f=1, 2, . . . n). Therefore, the average flow velocity U can be expressed as follows:

$$U=(\Sigma u_f/n)/(\Sigma d/R_f)$$

Consequently, distance $R_f$ from the inner wall surface to a position where the fluid flows at the average flow velocity U is fixed. If a flow velocity measurement position d is a fixed position within a range of the distance $R_f$, the flow velocity measured at the measurement position d and the average flow velocity U have a proportional relation.

The above observation result shows that the flow velocity in the vicinity of the inner wall surface of the pipe d is proportional to the flow rate in the pipe. When there is deviation in the flow, if the flow velocity $u_f$ in the vicinity of the inner wall surface is measured in a plurality of places where the pipe is divided into n equal parts along the path cross section, and the measured values are arithmetically averaged, the average flow velocity U can be firmly found as follows:

$$U=k\Sigma u_f/n$$

where k is a constant number. In short, the average flow velocity U can be measured regardless of the deviation of the flow. The same is true with the case that a turbulent flow occurs in the mainstream.

The invention has been made in light of the above knowledge and is basically constructed to measure the flow velocity of the fluid in the vicinity of the inner wall surface of the main path formed in the circular shape in path cross section.

Figure 3:
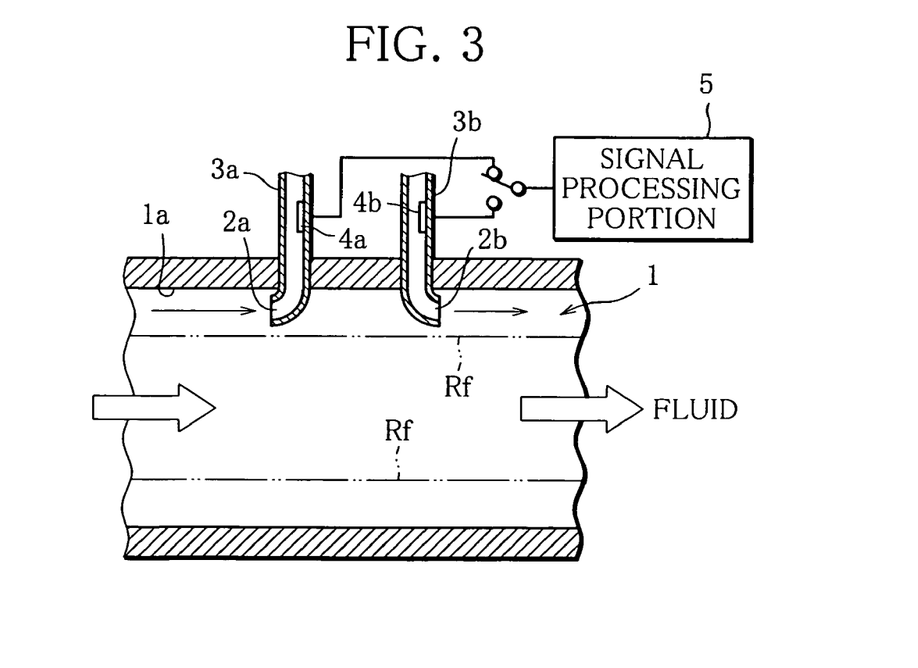
FIG. 3 is a cross-sectional view of a general construction of a substantial part for explaining the basic construction of the fluid detecting device according to an embodiment of the present invention.

FIG. 3 is a cross-sectional view of a general construction of a substantial part of the fluid detecting device according to an embodiment of the invention. Reference numeral 1 represents a main path (circular pipe) formed in a circular shape in path cross section. The main path 1 has a diameter that is fixed at least within an area illustrated. The fluid detecting device includes at least one branch path 3 having opening end portions (2a, 2b) in the vicinity of an inner wall surface 1a of a pipe forming the main path 1, and shunting and running part of the fluid that flows in the vicinity of the inner wall surface of the main path 1. The branch path 3 has a diameter that is fixed at least within an area illustrated. The branch path 3 includes an upstream-side branch path 3a whose opening end portion 2a is pointed toward the upstream side of the main path 1 and/or a downstream-side branch path 3b whose opening end portion 2b is pointed toward the downstream side of the main path 1. The fluid detecting device may be provided with both the upstream-side branch path 3a whose opening end portion 2a is pointed toward the upstream side and the downstream-side branch path 3b whose opening end portion 2b is pointed toward the downstream side, but may be provided with either one of the branch paths.

The opening end portions 2 of the branch path 3 are designed to have a height that falls in the range of from, for example, about 0.3 to 1.0 mm from the inner wall surface 1a of the pipe so that an opening position (measurement position d) thereof is closer to the inner wall surface of the pipe than the boundary $R_f$ of the Couette flow in order to shunt only the Couette flow in the vicinity of the inner wall surface 1a of the pipe into the branch path 3. For convenience, distance that extends from the inner wall surface of the pipe toward the center of the pipe is called "height". To be more specific, the opening end portions 2 each have a bore with a diameter of 0.8 mm, and the center of the bore is positioned at a height of 0.5 mm from the inner wall surface 1a of the pipe. The opening end portions 2 disposed at such a height shunt part of the flow of the fluid running through the main path, a so-called laminar boundary layer or laminar sub-layer, into the branch path 3.

The flow velocities (flow rates) of the fluids running through the branch path 3 (3a, 3b) are detected by means of thermal flowmeters 4 (4a, 4b) installed in the branch path 3. Detection signals of the thermal flowmeters 4 are transmitted to a signal processing portion 5 constructed of a microprocessor and the like, to thereby measure the average flow velocity (flow rate) U of the fluid running through the main path 1. Such thermal flowmeters 4 are well known as disclosed in for example the above-mentioned Unexamined Japanese Patent Application No. 4-230808.

In case that the branch path 3 is open toward a surrounding environment (the atmosphere, for example) at the other end, the part of the flow which is shunted from the main path 1 via the inflow-side opening end portion 2a is discharged outside via the branch path 3a. The fluid that flows from the outside into the branch path 3b is introduced from the outflow-side opening end portion 2b into the main path 1. In either case, the flow in the vicinity of the inner wall surface 1a of the pipe which is provided with the opening end portions 2 is a laminar boundary layer or laminar sub-layer that flows at a uniform speed in a path direction. The flows of the fluids running through the branch paths 3a, 3b depend on the flow of the laminar boundary layer or laminar sub-layer.

The branch paths 3a, 3b virtually shunt and run part of the laminar boundary layer or laminar sub-layer, and only difference between the branch paths 3a, 3b is that one of them shunts part of the flow of the laminar boundary layer or laminar sub-layer in the main path 1 while the other runs the fluid added from the outside as part of the flow of the laminar boundary layer or laminar sub-layer. Therefore, the flow velocity of the laminar boundary layer or laminar sub-layer can be accurately detected by detecting the flow velocities of the fluids that run through the branch path 3 (3a, 3b).

A cross-sectional area of the main path 1 in the vicinity of the opening end portions 2 is fixed all the time, so that the product of the cross-sectional area and the flow velocity is corresponding (proportional) to the flow rate. For this reason, the terms "flow velocity" and "flow rate" are occasionally used here as replaceable with each other. In addition, they are generically called "flow".

Figure 4:
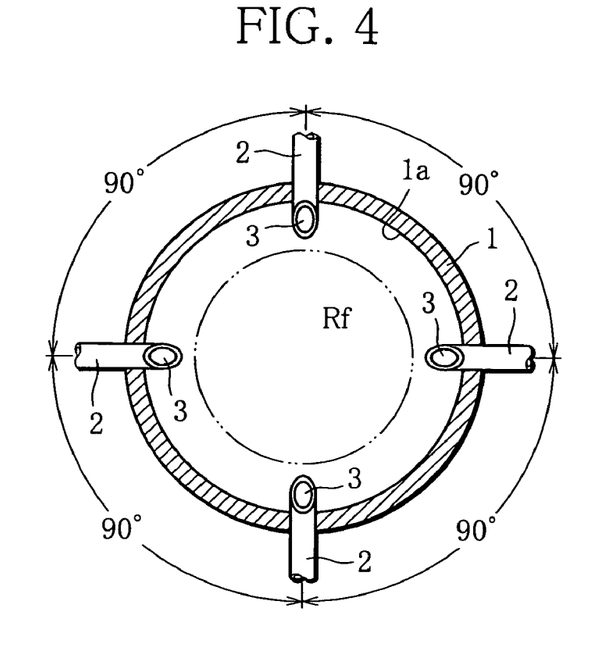
FIG. 4 is a view showing a fixing position of an opening end portion of a branch path in a cross section of a main path for explaining another embodiment of the fluid detecting device according to the present invention.

The branch path 3 (3a, 3b) may be plurally arranged along the circumference of the inner wall surface 1a of the pipe in the path cross section formed by the main path 1. In this case, the opening end portions 2 of the branch path 3 are disposed at equiangular intervals around an axis of the main path 1 as illustrated in FIG. 4 showing a cross section of the main path 1 as a pattern diagram. Specifically, in case that four branch paths 3 are provided, the inner wall surface 1a of the pipe of the main path, which is in an annular shape, is divided into equal parts at an angle of 90 degrees, and the opening end portions 2 of the branch paths 3 are located in the equally-dividing positions. In this case, it is desired that the branch paths 3 have the same diameters (for example, 0.8 mm in bore size). By detecting the flow velocities of the fluids shunted into the respective branch paths 3, for example even if there is deviation in the flow of the fluid running through the main path 1 as illustrated in FIG. 2, it is possible to detect the flow velocity in each part of the inner wall surface 1a of the pipe according to the deviation.

Consequently, if the flow velocities in the respective parts of the inner wall surface 1a of the pipe which are detected through the branch paths 3 are comprehensively judged, and for example, difference of the flow velocities in the respective parts are found, it is possible to evaluate the deviation in the flow of the fluid running through the main path 1. Furthermore, if the flow velocities in the respective parts of the inner wall surface 1a of the pipe which are detected through the branch paths 3 are arithmetically averaged, the average flow rate can be found without difficulty, regardless of the deviation in the flow. In other words, even if there is a curved pipe line on the upstream side of a flow rate measurement portion, and as a result, there is distortion (deviation of the flow velocity distribution) in the flow of the fluid running through the main path 1, the average flow velocity can be measured with ease and accuracy.

Again, the opening end portions 2 arranged at equiangular intervals around the axis of the main path 1 may be either the inflow-side opening end portion 2a pointed toward the upstream side of the main path 1 or the outflow-side opening end portion 2b pointed toward the downstream side of the main path 1. The opening end portions 2 may also be disposed at a fixed height that falls in the range of from, for example, about 0.3 to 1.0 mm from the inner wall surface 1a of the pipe such that the opening positions (measurement positions d) are lower than the boundary $R_f$ of the Couette flow.

Figure 5:
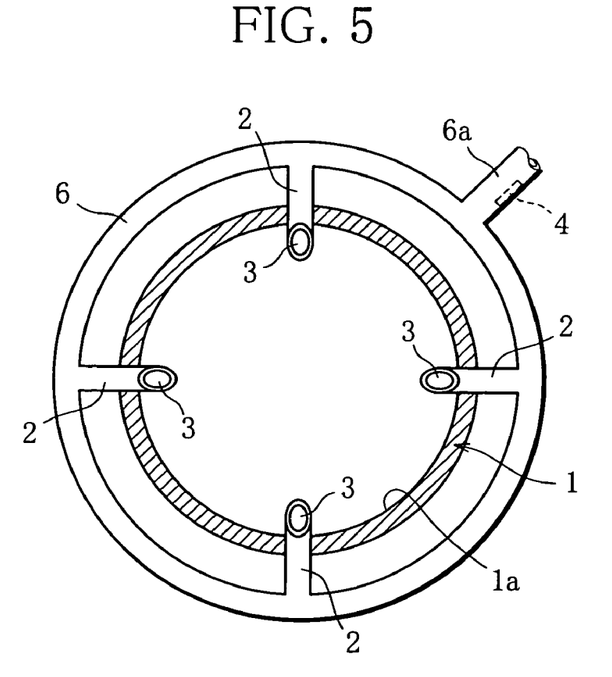
FIG. 5 is a pattern diagram of a structure of the branch path for explaining further another embodiment of the fluid detecting device according to the present invention.

The branch paths 3 may be connected in parallel with each other through a connecting path 6 for example as illustrated in FIG. 5, and the thermal flowmeter 4 may be provided to the connecting path 6 that converges the fluids running through the branch paths 3. That is to say, the other end portions of the branch paths 3 provided with the opening end portions 2 in positions where the main path 1 is divided into equal parts in the circumferential direction are caused to communicate with the connecting path 6 formed in an annular shape along the outer circumference of the main path 1. The thermal flowmeter 4 may be installed in a converging path 6a branching from a part of the connecting path 6.

In this case, the connecting path 6 and the converging path 6a correspond to the communicating portion. For a desired embodiment, path resistance of at least either the branch paths 3 or the connecting path 6 should be set to be great, and path resistance of the converging path 6a to be small. To this end, for example, path cross-sectional area of each of the branch paths 3 is set to be 0.5 mm$^2$, and path cross-sectional area of the connecting path 6 is set to be 4.0 mm$^2$ which is greater than the total of the path cross-sectional areas of the four branch paths 3, which is 2.0 mm$^2$, and path cross-sectional area of the converging path 6a is set to be 6.0 mm$^2$ which is still greater. By so doing, the path resistances can get smaller in order from the branch paths 3 to the connecting path 6 to the converging path 6a. However, if the path cross-sectional area of the converging path 6a is greatened too much, the flow velocity becomes too small and gets out of a detection range of the thermal flowmeter 4, so that attention is demanded.

If the fluid detecting device is thus constructed, part of the fluid flow shunted in the vicinity of the wall surface of the main path 1 in the opening end portions 2 flows through the branch paths 3 into the connecting path 6 to be converged into one flow in the converging path 6a. The thermal flowmeter 4 therefore detects a total flow rate corresponding to the total of the flows shunted into the branch paths 3. If the total flow rate detected by the thermal flowmeter 4 is divided by the number n of the branch paths 3, a flow rate for one branch path 3, namely an average flow rate of the branch paths 3, can be calculated. Furthermore, it is possible to easily measure an average flow velocity of the fluid (laminar boundary layer or laminar sub-layer) that runs in the vicinity of the inner wall surface of the main path 1, and then by multiplying the average flow velocity by a prescribed constant number, it is possible to measure an average flow velocity of the fluid running through the main path 1.

To employ the above construction eliminates the need for installing the thermal flowmeters 4 in the respective branch paths 3, and only one thermal flowmeter 4 will be sufficient. As a consequence, for example, in spite of the need for the connecting path 6 for the parallel connection of the branch paths 3, the entire construction including the signal processing system can be simplified. Again, the branch paths 3 for parallel connection may be either the branch paths 3a whose opening end portions 2a are pointed toward the upstream side of the main path 1 or the branch paths 3b whose opening end portions 2b are pointed toward the downstream side of the main path 1.

Figure 6:
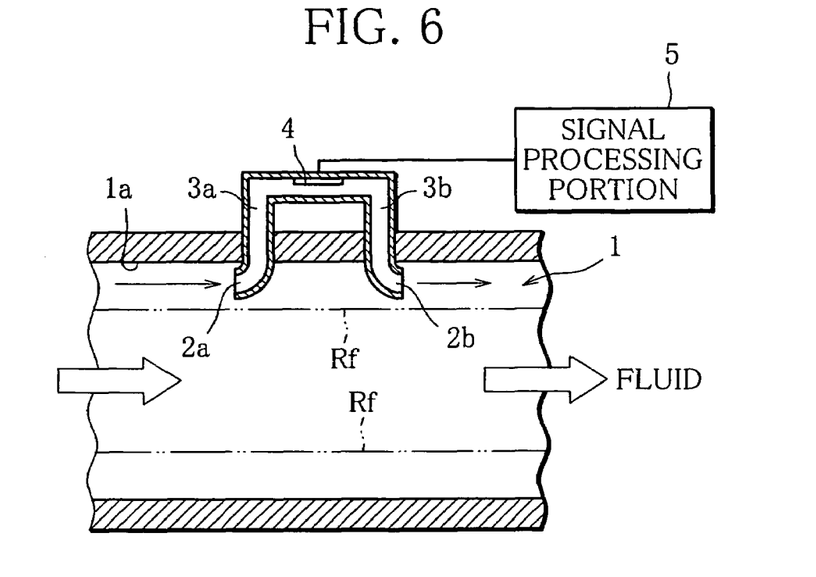
FIG. 6 is a view of a general construction of a substantial part of a preferred embodiment of the fluid detecting device according to the present invention.

In case that the main path 1 is provided with the upstream-side branch paths 3a whose opening end portions 2a are pointed toward the upstream side of the main path 1 and the downstream-side branch paths 3b whose opening end portions 2b are pointed toward the downstream side of the main path 1, the other end portions of the branch paths 3a, 3b may be made to communicate with each other as illustrated in FIG. 6, to thereby return the part of the fluid, which is introduced from the main path 1 into the upstream-side branch path 3a, to the main path 1 via the downstream-side branch path 3b.

In this case, the opening end portions 2a, 2b of the branch paths 3a, 3b preferably face in opposite directions so that the fluid shunted into the branch path 3a is not returned upstream from the opening end portion 2a via the branch path 3b. In other words, the fluids shunted into the branch paths 3a, 3b are preferably returned to branch points or downstream therefrom. However, the possibility that the fluid shunted into the branch path 3a is returned upstream from the opening end portion 2a via the branch path 3b is not denied.

In case that the branch paths 3a whose opening end portions 2a are pointed toward the upstream side of the main path 1 and the branch paths 3b whose opening end portions 2b are pointed toward the downstream side of the main path 1 are provided in pairs, the other end portions of the branch paths 3a, 3b may be individually made to communicate with each other. As stated above, however, if the branch paths 3a and the respective branch paths 3b are arranged to be connected in parallel, the other end portions (the other end portion of the connecting path 6) of the branch paths 3a, 3b that are connected in parallel are made to communicate with each other.

If the other end portions of the branch paths 3a whose opening end portions 2a are pointed toward the upstream side of the main path 1 and the other end portions of the branch paths 3b whose opening end portions 2b are pointed toward the downstream side of the main path 1 are made to communicate with each other as described, part of the fluids shunted from main path 1 into the branch paths 3a are returned to the main path 1 via the branch paths 3b, which makes it possible to stabilize the flows thereof. Moreover, the fluid running through the main path 1 is not discharged outside thereof, and the fluid introduced from the outside does not get mixed with the fluid running through the main path 1, so that there generates no change in the fluid itself which runs through the main path 1. This makes it possible to detect the flow velocity (flow rate) of the fluid running through the main path 1 without influencing the fluid. In addition, operation reliability can be fully improved as a fluid detecting device.

Figure 7:
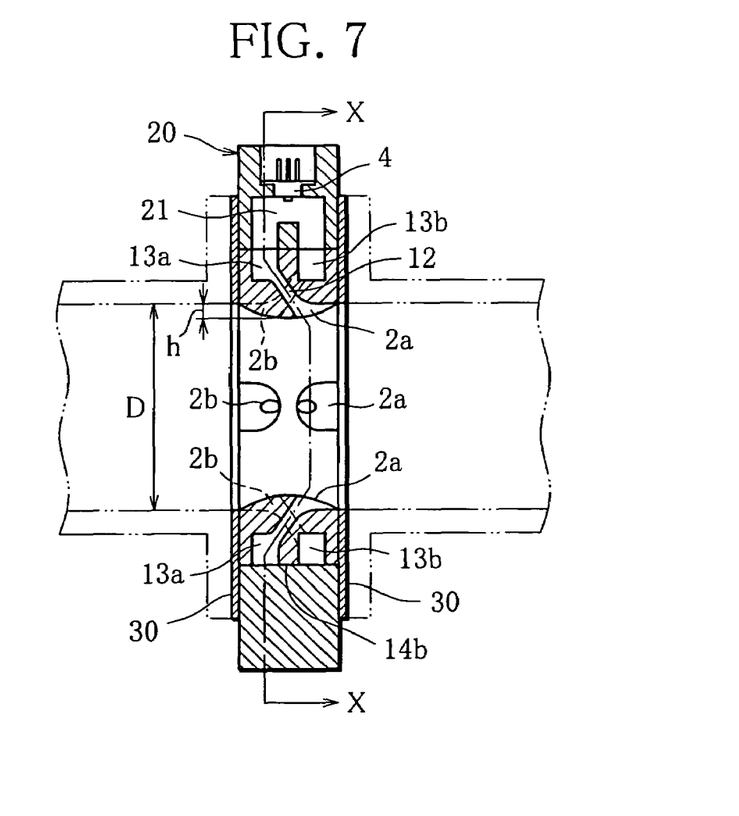
FIG. 7 is a longitudinal sectional view of a general construction of the specific fluid detecting device according to the present invention.
Figure 8:
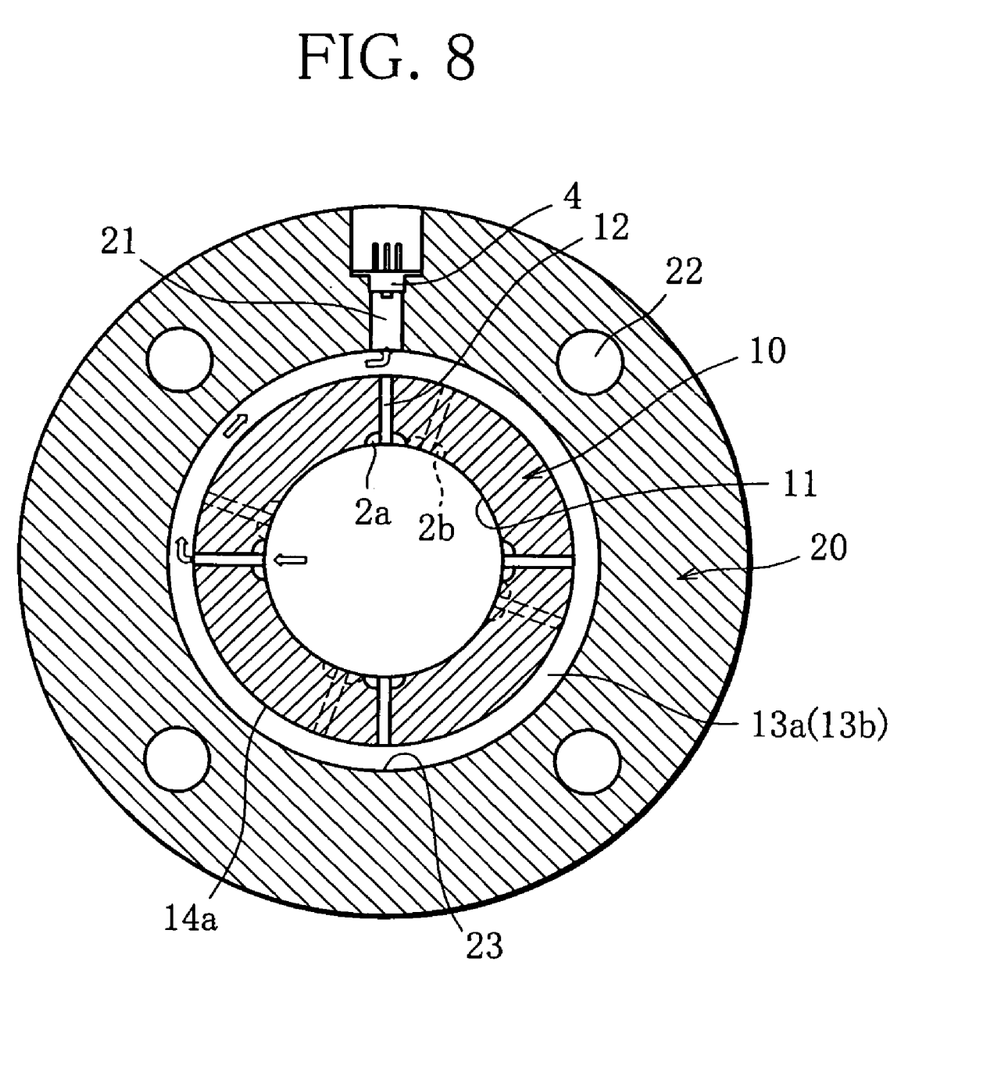
FIG. 8 is a cross-sectional view, taken along line X—X in the fluid detecting device of FIG. 7.

The fluid detecting device thus constructed can be embodied as, for example, a low-profile device as illustrated in FIGS. 7 and 8. FIG. 7 shows a structure of a longitudinal section of the fluid detecting device, and FIG. 8 shows a structure of a cross section of the fluid detecting device, taken along a broken line X—X in FIG. 7. The upstream side is on the right, and the downstream side on the left, facing into the drawing as viewed The device is so constructed as to be applied in a state interposed in a flange coupling portion of a cylindrical gas pipe through which fuel gas or the like runs. The device includes a ring-shaped first member 10 having prescribed thickness (9 mm, for example) and a ring-shaped second member 20 fitted to an outer circumference of the first member 10. The first and second members 10, 20 are formed of metal members, but may be made of plastic having high heat resistance.

An annular inner wall surface 11 of the ring-shaped first member 10 having the prescribed thickness forms the main path 1 for the fluid. The inner wall surface 11 has an internal diameter D that is varied to be smoothly curved in a thickness direction of the first member 10 (fluid-flowing direction) to be formed into a curved surface having a moderately streamlined shape forming a semicircular arc in section or a semi-ellipse in section in which the internal diameter D is minimum in the central portion.

In consideration of the internal diameter (21 mm, for example) of the gas pipe, the maximum internal diameter D of the inner wall surface 11 is set to be 21 mm in both end portions. Inward projection height h in the central portion of the inner wall surface is set to fall in the range of from, for example, about 0.5 to 1.0 mm. More specifically, the minimum internal diameter D-2h of the inner wall surface 11 is set to fall in the range of from about 19 to 18 mm, thus making pressure loss given to the fluid running through the main path extremely small in consort with the above-mentioned smoothly curved surface.

In the first member 10, a plurality of through-holes 12 that define the branch paths 3 provided with the opening end portions 2 are bored from the inner wall surface 11 to an outer circumferential surface 14a of the first member 10. The opening end portions 2 are each formed into an elliptical recessed portion that opens in the thickness direction of the first member 10 to have a funnel-like shape from the central portion of the inner wall surface 11 having a semicircular arc-shaped cross section or a semi-elliptical-shaped cross section through both side portions thereof. The opening end portions 2 formed into the recessed portions are each disposed to open at an angle of, for example, substantially 60 degrees with respect to the axis of the main path 1. In FIG. 7, the opening end portions 2a and the respective opening end portions 2b are drawn slightly apart from each other from side to side. When the fluid detecting device is actually designed, however, the opening end portions 2a and the respective opening end portions 2b may be completely superimposed upon each other in the cross-sectional direction by optimizing the angle.

One of the opening end portions 2 arranged from the central portion of the inner wall surface 11 through both the side portions functions as the inflow-side opening end portion 2a that opens toward the upstream side of a fluid-flowing direction, and the other as the outflow-side opening end portion 2b that opens toward the downstream side of the fluid-flowing direction. The opening end portions 2 (2a, 2b) pointed toward the upstream and the downstream side in the fluid-flowing direction are disposed in positions dividing the inner wall surface 11 into equal parts in the circumferential direction as described above, thereby shunting and introducing part of the flow of the laminar boundary layer or laminar sub-layer which runs in the vicinity of the inner wall surface 11 of the first member 10 into the through-holes 12 (branch paths 3).

By employing the above construction, the inflow-side opening end portions 2a and the respective outflow-side opening end portions 2b of the branch paths are positioned extremely close to each other, which virtually resolves the problem that sensitivity is decreased with respect to a certain oscillation frequency (wavelength) of the fluid.

Two grooves 13a, 13b are formed in an outer circumferential surface 14b of the first member 10 in parallel with each other in the circumferential direction. The grooves 13a, 13b communicate with the other end portions of the through-holes 12 at bottom portions thereof (namely, the outer circumferential surface 14a). Upper surfaces of the grooves 13a, 13b are closed by an inner circumferential surface 23 of the second member 20 which is fitted to the outer circumferential surface of the first member 10 to form the annular communicating path 6.

The second member 20 includes the inner circumferential surface 23 that is fitted to the outer circumferential surface of the first member 10 to close the upper surfaces of the grooves 13a, 13b as mentioned and a recessed space portion 21 that is pierced in part of the inner circumferential surface 23 to cause the grooves 13a, 13b to communicate with each other. A flowmeter-fixing hole having a prescribed shape is pierced in a bottom surface of the space portion 21. The thermal flowmeter 4 mounted on a package having a prescribed shape is interfitted in the flowmeter-fixing hole from a outer circumferential surface side of the second member 20.

In a state where the upper surfaces of the grooves 13a, 13b are closed and fit together, that is, in a state where the first member 10 is interfitted with the inner circumferential surface 23 of the second member 20, the first member 10 and the second member 20 are coupled and integrated with each other, for example, by tightly welding the first member 10 and the second member 20, or the like. Such integration causes the branch paths 3 defined by the through-holes 21 to communicate with the connecting path 6 defined by the grooves 13a, 13b via the space portion 21. The cross-sectional area of each of the branch paths 3 is determined such that the narrowest portion of the opening end portion 2 is the smallest, and so as to get larger in the grooves 13 and the space portion 21 in order of mention. As a consequence, fluid resistance is set to get smaller from the grooves 13 to the space portion 21.

Although not shown for simplification, in FIG. 7, an annular groove may be formed in a contact surface of the outer circumference of the first member 10 and the inner circumference of the second member 20 between the grooves 13a and the grooves 13b, and a gasket, such as an O ring, may be disposed in the annular groove. Such a gasket prevents the leakage of the fluids that run from the grooves 13a through a gap of the contact surface into the grooves 13b, the leakage being attributable to a deficiency in operating accuracy. As a result, the fluids running through the grooves 13a are sure to flow into the grooves 13b via the space portion 21, which promotes the prevention of detection errors.

In the second member 20 and gaskets 30, 30 for maintaining airtightness, a plurality of circular holes 22 are formed in equiangular intervals as illustrated in FIG. 8 so as to avoid where the space portion 21 is disposed. The circular holes 22 are for inserting bolts, not shown, which are to be fitted to the flange coupling portion of a gas pipe to couple a pair of opposite flange portions. In place of the gaskets 30, an annular groove may be formed in a surface opposite to the pipe flange in the second member 20, and an O-ring-shaped gasket may be situated therein. A material for the gaskets may be suitably selected from well-known materials, such as rubber and soft copper, according to working temperature. If the gaskets 30, 30 is made of a material having low heat conductivity (for example, a mold of heat-resistant fibers), and the second member 20 is made of a material having high heat conductivity (for example, aluminum), the shunted combustion gas can be efficiently refrigerated. In order to further encourage the refrigeration of the combustion gas, a path length of the space portion 21 may be elongated by increasing the diameter of the second member 20, or a cooling fin or a cooling system for refrigerating a surrounding area of the space portion 21 may be situated outside.

The low-profile fluid detecting device having the above construction can be easily installed in a fuel gas supply system, such as a gas turbine, if only sandwiched between the flange coupling portions of an existing gas pipe to be interposed in the path. Additionally, part of the flow of the laminar boundary layer or laminar sub-layer of the fuel gas running through the gas pipe, which runs in the vicinity of the wall surface of the gas pipe, is introduced to the space portion 21, to thereby effectively measure the flow velocity (flow rate). Since the flow velocity (flow rate) of the fuel gas running through the gas pipe can be measured as flow velocities of the fluids flowing through the branch paths 3 with high accuracy, practical advantages of the device are enormous.

Even if the fuel gas running through the gas pipe is high in temperature, or if the fuel gas contains dust, since the measurement is conducted after bypassing part of the fuel gas via the branch paths 3, the fuel gas can be refrigerated halfway, and furthermore the dust can be removed by an inertial dust collection effect possessed by the bending path structure. In general, even the thermal flowmeter 4 that does not have very high heat resistance can perform the measurement with ease and stability. Unlike a flowmeter that carries out flow measurement by using differential pressure produced by a conventional orifice, the thermal flowmeter 4 detects a mass flow rate of the fluid by the flow in the vicinity of the inner wall of the path, thereby bringing advantages that the measurement can be performed with high accuracy without causing the problem of pressure loss and the like.

Figure 9:
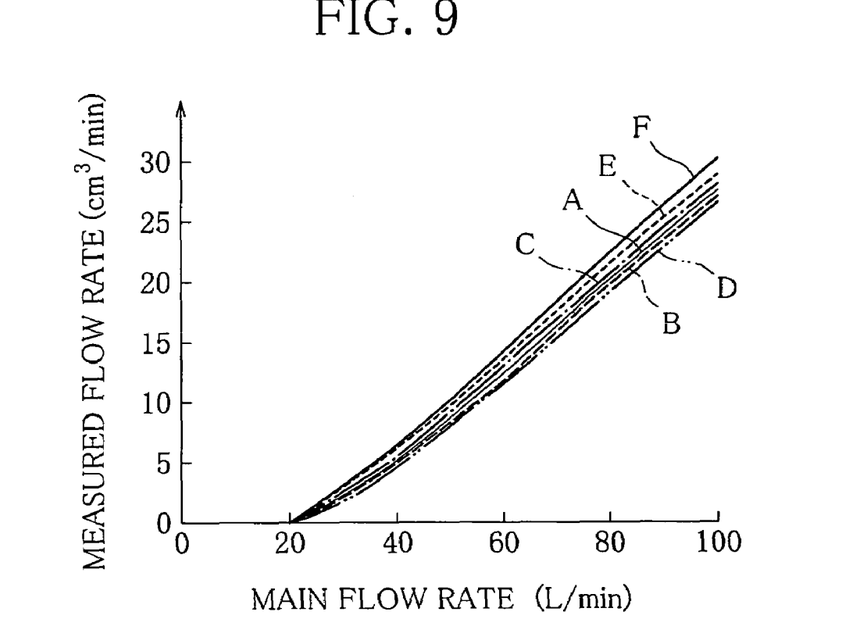
FIG. 9 is a view of measurement characteristics of the fluid detecting device of FIGS. 7 and 8.

FIG. 9 shows a relation between a flow rate measured by using the fluid detecting device with the above structure and an actual flow rate of the fluid running through the main path 1 in comparison. A characteristic A in FIG. 9 shows a measurement characteristic in case that straight pipes (gas pipes) each having an internal diameter of 21 mm are connected to the upstream and the downstream side, respectively, via flanges. A characteristic B shows a measurement characteristic in case that straight pipes (gas pipes) each having an internal diameter of 27 mm are connected to the upstream and the downstream side, respectively, via flanges. A characteristic C shows a measurement characteristic in case that a straight pipe (gas pipe) having an internal diameter of 21 mm is connected to the upstream side, and a straight pipe (gas pipe) having an internal diameter of 27 mm to the downstream side.

A characteristic D shows a measurement characteristic in case that a bending pipe (gas pipe) having an internal diameter of 21 mm is connected to the upstream side, and a straight pipe (gas pipe) having an internal diameter of 21 mm to the downstream side. A characteristic E shows a measurement characteristic in case that a bending pipe (gas pipe) having an internal diameter of 27 mm is connected to the upstream side, and a straight pipe (gas pipe) having an internal diameter of 27 mm to the downstream side. Lastly, a characteristic F shows a measurement characteristic in case that a bending pipe (gas pipe) having an internal diameter of 21 mm is connected to the upstream side, and a straight pipe (gas pipe) having an internal diameter of 27 mm to the downstream side.

As shown by the characteristics A through F, it was verified that the fluid detecting device according to the invention made it possible to obtain detection characteristics shown by substantially straight lines, while remaining nearly unaffected by the internal diameter of the gas pipe, and despite whether the gas pipe was a straight or bending pipe, that is to say, regardless of presence or absence of distortion of the fluid flow. It was also verified that there was little error between a main flow rate and an average sidewall flow rate. In other words, the area in which the flow and the detection output were considered to be in a proportional relation was relatively wide, so that it was verified that sufficient detection accuracy is attained.

Figure 10:
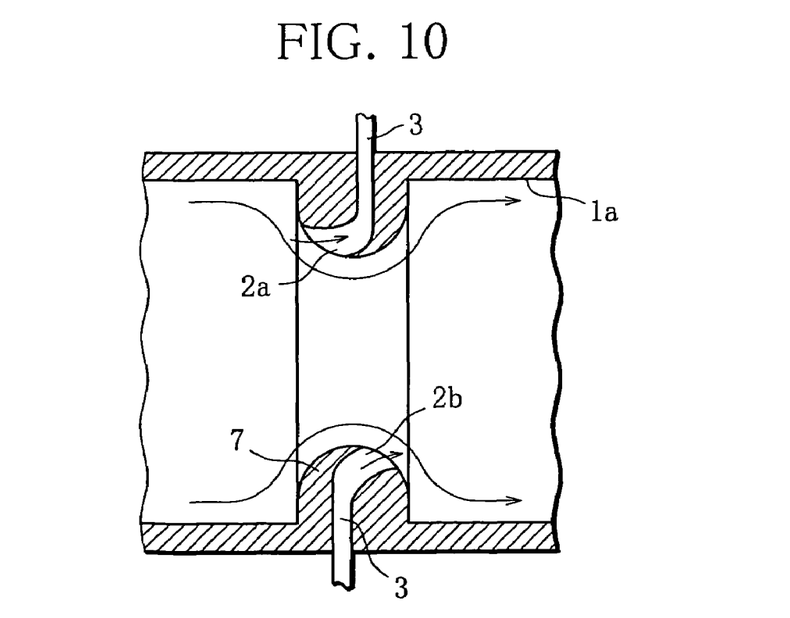
FIG. 10 is a view of a modification example of the fluid detecting device according to the present invention.

In light of these experimental results, for example as shown in FIG. 10, even if the opening end portions 2 are formed in tip ends of portions 7 which narrow the path cross-sectional area of the main path 1 and protrude in the inside of the pipe, the protrusion height thereof does not cause a big problem as long as the protruding portions 7 do not hamper the laminar boundary layer or the laminar sub-layer that flows in the vicinity of the inner wall surface of the main path 1. Considering that a standard gas pipe has an internal diameter of 21 mm or 27 mm, if only there is provided the fluid detecting device in which a minimum internal diameter of the main path 1 is 19 mm, the device can be applied to a standard pipe having a bore diameter of 21 mm or 27 mm without change.

Figure 11:
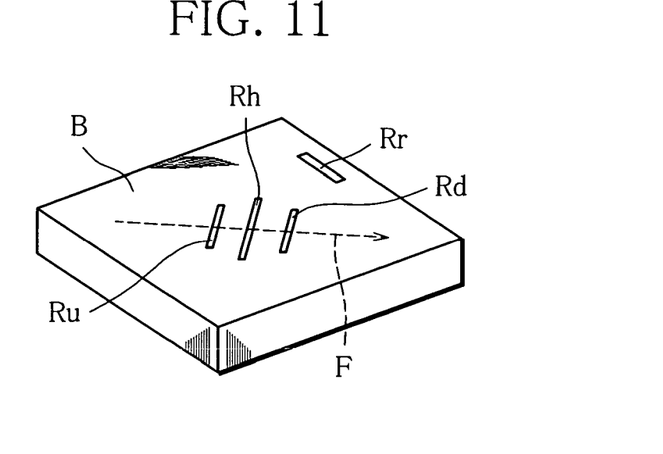
FIG. 11 is a perspective view of the outer appearance of an example of a thermal flowmeter that is installed in the fluid detecting device according to the present invention.

The thermal flowmeter 4 installed in the flow rate-detecting device will be briefly described below. The thermal flowmeter has an elemental structure in which a pair of temperature sensors Ru, Rd made up of resistance thermometer bulbs are arranged in a fluid-flowing direction F such that a heater element Rh made up of a heating resistive element disposed on a silicon base B is interposed therebetween, for example as shown in FIG. 11, and the flowmeter is called a micro flow sensor. The thermal flowmeter (micro flow sensor) detects a flow rate Q of the flow by a resistance value change attributable to heat of the temperature sensors Ru, Rd, using the fact that a diffusion level (temperature distribution) of heat that is generated by the heater element Rh is changed according to the fluid flow.

To be concrete, the thermal flowmeter measures the flow rate Q, using the fact that the heat generated by the heater element Rh is added to the downstream-side temperature sensor Rd according to the flow rate Q of the fluid, and this makes the resistance value change attributable to the heat of the temperature sensor Rd greater than the upstream-side temperature sensor Ru. Reference character Rr in the drawing represents a temperature sensor made up of a resistance thermometer bulb disposed away from the heater element Rh and is used for measurement of ambient temperature.

Figure 12:
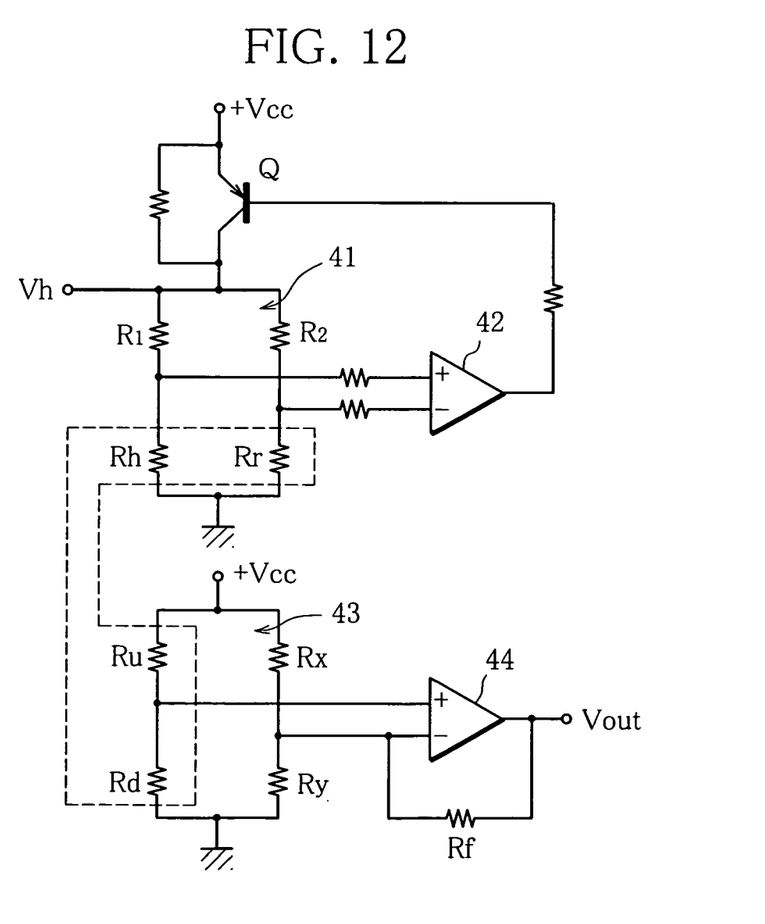
FIG. 12 is a view of a basic circuit construction of the thermal flowmeter of FIG. 11.

FIG. 12 shows a general construction of a thermal flowmeter using the above-mentioned micro flow sensor. A drive circuit of the heater element Rh is constructed such that a bridge circuit 41 is formed by using the heater element Rh, the temperature sensor Rr for ambient temperature measurement, and a pair of fixed resistors R1, R2, to thereby apply voltage Vcc supplied from a prescribed power source to the bridge circuit 41 through a transistor Q. Simultaneously, bridge output voltage of the bridge circuit 41 is found by a differential amplifier 42, and the transistor Q is subjected to feedback control so that the bridge output voltage becomes zero, to thereby adjust heater drive voltage added to the bridge circuit 41. Due to the heater drive circuit thus constructed, heating temperature of the heater element Rh is so controlled as to be constantly higher than ambient temperature t only by a constant temperature difference $\Delta t$.

A flow rate detecting circuit for detecting the flow rate Q of the fluid running along the micro flow sensor by a resistance value change attributable to the heat of the temperature sensors Ru, Rd is constructed such that a bridge circuit 43 for flow rate measurement is formed by using the temperature sensors Ru, Rd and a pair of fixed resistors Rx, Ry, to thereby detect bridge output voltage according to the resistance value change of the temperature sensors Ru, Rd by means of a differential amplifier 44. Under the condition that a heating value of the heater element Rh be constant by using the heater drive circuit, the flow rate Q of the fluid running along the micro flow sensor is found by bridge output voltage Vout detected by the differential amplifier 44. A characteristic of such a micro flow sensor is the capability of measuring an air current of an extremely low flow velocity (for example, 0.3 mm/second at a lower limit). Consequently, even if the flow rates of the branch paths are extremely small (for example, about 1/1000) in relation to the flow rate of the main path as in the above embodiment, the fluids running through the branch paths can be detected with high sensitivity.

In the thermal flowmeter thus constructed, if heater drive voltage Vh applied to the bridge circuit 41 is monitored as illustrated in FIG. 12, since the heater drive voltage Vh corresponds to a change in the ambient temperature, for example, it is possible to consider a temperature change attributable to combustion oscillation transmitted from a combustion chamber as a rate of change (amplitude) and oscillation frequency of the heater drive voltage Vh. In other words, the combustion oscillation is transmitted to the fuel gas in the gas pipe or the like, which is near the combustion chamber, and ambient air. Therefore, if such combustion oscillation is considered as a change in the drive voltage of the heater element Rh in the thermal flowmeter, this makes it possible to monitor the combustion oscillation without difficulty. It is then possible to perform the flow rate measurement using the thermal flowmeter and to monitor the combustion oscillation using the same thermal flowmeter.

Figure 13:
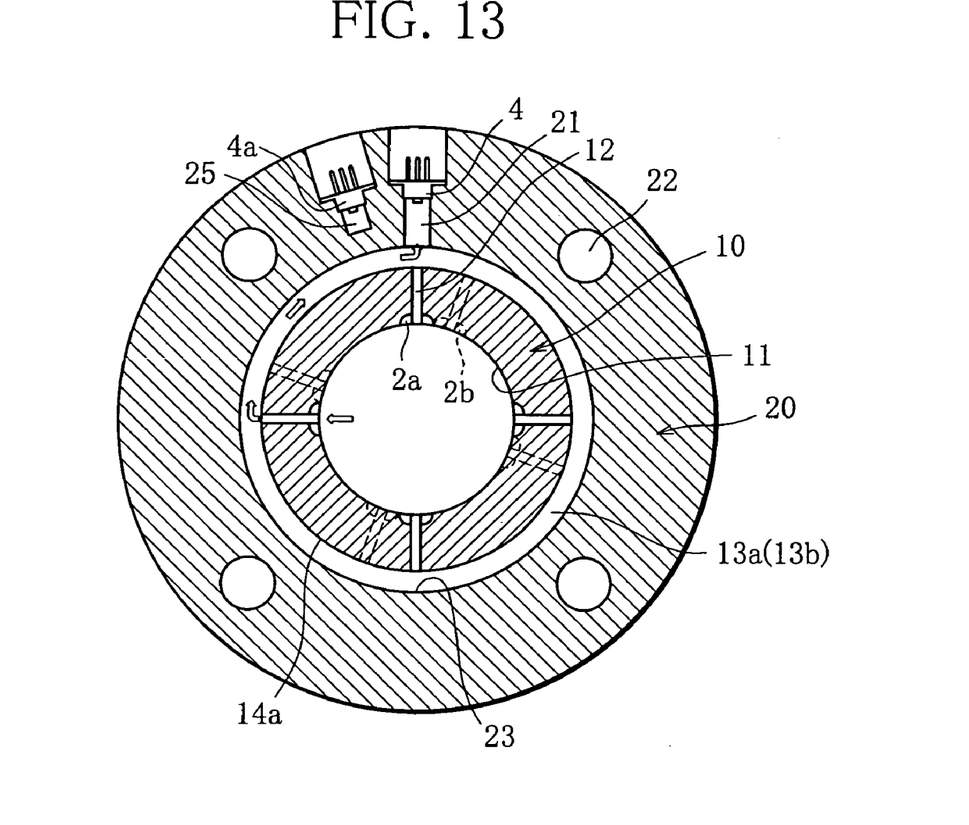
FIG. 13 is a view of a general construction of a substantial part of the fluid detecting device according to further another embodiment of the present invention.

In case that the thermal flowmeter is realized, for example as illustrated in FIG. 13 showing a general construction of a substantial part thereof, there may be provided an auxiliary space portion 25 away from the branch paths 3 in addition to the space portion 21 that links the connecting path 6 made up of the grooves 13a, 13b to form the communicating path, and an auxiliary thermal flowmeter (flow rate sensor) 4a may be disposed in the auxiliary space portion 25. The auxiliary space portion 25 is a airtight space created by closing an opening portion of a recessed portion with a bottom which is bored in the outer circumferential surface of the second member 20 with the auxiliary thermal flowmeter (flow rate sensor) 4a fixed to the second member 20. In short, the auxiliary space portion 25 is formed as a space that does not interfere with the fluid flow. The auxiliary thermal flowmeter 4a that is specified similarly to the thermal flowmeter 4 is disposed, to thereby detect a state of the flow in the inside of the auxiliary space 25 irrelevant to the fluid flow.

Applied to the fluid in the inside of the auxiliary space portion 25 is oscillation relatively similar to the oscillation applied to the fluids running through the branch paths 3, along with automatic oscillation generated in the pipe to which the fluid detecting device is fixed. The thermal flowmeter (flow rate sensor) 4 and the auxiliary thermal flowmeter (flow rate sensor) 4a are applied with basically similar noises under electrical and magnetic influences from the outside. As a consequence, detected by the auxiliary thermal flowmeter 4a disposed in the auxiliary space portion 25 are only external factors (oscillation and noises) applied to the fluid in the auxiliary space 25 and internal noises produced in the auxiliary thermal flowmeter 4a. The use of the auxiliary thermal flowmeter 4a makes it possible to detect elements including the oscillation, electrical noises, and the like, transmitted from a combustion chamber and the like through the pipe. The thermal flowmeter 4 and the auxiliary thermal flowmeter 4a are each constructed as illustrated in FIG. 12.

Figure 14:
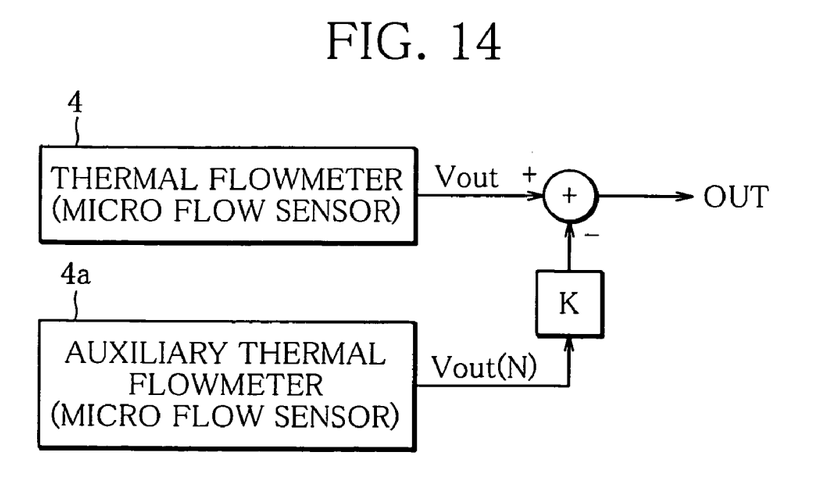
FIG. 14 is a view of a general construction of an output conversion circuit in the fluid detecting device of FIG. 13.

As illustrated in FIG. 14, a signal element Vout(N) that does not interfere with the fluid flow which is detected by the auxiliary thermal flowmeter 4a is subtracted from the output Vout corresponding to the fluid flow (flow rate) which is detected by the thermal flowmeter 4. In this case, it is desirable that after the signal element Vout(N) is multiplied by a prescribed conversion coefficient K, the result be used for conversion of the output Vout of the thermal flowmeter 4. That is to say, the output Vout corresponding to the fluid flow (flow rate) which is detected by the thermal flowmeter 4 includes the signal element Vout(N) that is relatively detected by the auxiliary thermal flowmeter 4a. For this reason, if the output Vout(N) of the auxiliary thermal flowmeter 4a is subtracted from the output Vout of the thermal flowmeter 4, it is possible to measure only an element (flow rate) dependent on the fluid flow with high accuracy.

Therefore, if the signal element Vout(N) included in the fluid and independent of the fluid flow is detected by the auxiliary thermal flowmeter 4a apart from the thermal flowmeter 4, and the output Vout of the thermal flowmeter 4 is converted using the signal element Vout(N), it is possible to effectively drown out noise elements included in the fluid flow, attributable to oscillation and the like, the electrical noises produced by the thermal flowmeter 4 and the auxiliary thermal flowmeter 4a themselves, and the like. Therefore, highly accurate flow (flow rate) measurement can be carried out with a higher signal-to-noise ratio.

Depending on the volume of the auxiliary space portion 25, however, there is a possibility that the auxiliary space portion 25 functions as an automatic filter with respect to oscillation. In order to resolve such a problem, for example, the auxiliary space portion 25 may be filled with atmosphere by forming a small hole, not shown, from the outer circumferential surface of the second member 20 to the auxiliary space portion 25. Alternatively, the auxiliary space portion 25 may be filled with the measured fluid by forming a small hole, not shown, from the inner circumferential surface 23 of the second member 20 to the auxiliary space portion 25. This should be done with care so that the auxiliary space portion 25 does not hamper the fluid flow. In the case of the structure in which the auxiliary space portion 25 is open to the atmosphere or the measured fluid as mentioned above, dimensions and a shape of the auxiliary space portion 25 and of the small hole should be properly adjusted so that oscillation elements in a measurement frequency band are not decreased.

The present invention is not limited to the above embodiment. For example, the number n of the opening end portions 2 that are plurally formed along the inner wall surface of the main path 1 in the circumferential direction thereof may be determined in accordance with the specification thereof. As to the size and shape of the opening end portions 2, modification can be made in various ways. For example, in place of the recessed portion, a tubular protruding portion may be provided. The sectional shape of the main path 1 is not limited to a circle. When n opening end portions 2 are formed in the main path 1 having a shape other than the circular shape, an optimum installation location for each of the opening end portions 2 is preferably found out through an experiment. Alternatively, the sectional area of the main path 1 may be divided into n equal parts along virtual lines (where the virtual lines pass through the center of the cross section of the main path), to thereby form the opening end portions 2 on the virtual center lines of the respective divided pieces. This corresponds to the disposition of the opening end portions 2 at equal angles around the main path 1 when the main path 1 has a circular cross section. As to the thermal flowmeter, in place of the micro flow sensor integrated on a semiconductor, a flowmeter with a temperature sensor constructed of a thermopile (thermocouple) or a thermal flowmeter using a wire of several microns may be utilized. The point is that various modifications can be made without deviating from the gist of the invention.

The invention claimed is:

1. A fluid detecting device comprising:
a main path through which a fluid runs;
a plurality of branch paths, each of which: (i) comprises an opening end portion that is positioned in the vicinity of an inner wall surface of the main path so as to point to an upstream side of the main path, and (ii) causes part of a fluid flowing in the vicinity of the inner wall surface of the main path to run therethrough via the opening end portion; and
at least one thermal flow sensor that detects a flow of the fluid running through the branch paths;
wherein the opening end portions of said plurality of branch paths, which are pointed toward the upstream side of said main path, are arranged at regular intervals around an axis of said main path in a cross-section of said main path.

2. The fluid detecting device according to claim 1, wherein:
the plurality of branch paths, which comprise the opening end portions pointed toward the upstream side of said main path at respective first ends thereof, are coupled to each other at second ends thereof to form one path; and
said thermal flow sensor is disposed in said one path and detects a total flow rate of the fluid running through the branch paths.

3. The fluid detecting device according to claim 2, wherein an end portion of said one path is open toward a surrounding environment of said main path.

4. The fluid detecting device according to claim 1, further comprising an auxiliary thermal flow sensor, which is positioned at a location where said branch paths are not formed, and which detects a state of said fluid.

5. The fluid detecting device according to claim 4, wherein said auxiliary thermal flow sensor is disposed in a fluid-pooling portion that communicates with said branch paths.

6. The fluid detecting device according to claim 1, wherein each of said branch paths comprises another end portion which is open toward a surrounding environment of said main path.

7. A fluid detecting device comprising:
a main path through which a fluid runs;
a plurality of branch paths, each of which: (i) comprises an opening end portion that is positioned in the vicinity of an inner wall surface of the main path so as to point to a downstream side of the main path, and (ii) causes fluid to flow therethrough via the opening end portion into the vicinity of the inner wall surface of the main path; and
at least one thermal flow sensor that detects a flow of the fluid running through the branch paths;
wherein the opening end portions of said plurality of branch paths, which are pointed toward the downstream side of said main path, are arranged at regular intervals around axis of said main path in a cross-section of said main path.

8. The fluid detecting device according to claim 7, wherein:
the plurality of branch paths, which comprise the opening end portions pointed toward the downstream side of said main path at respective first ends thereof, are coupled to each other at second ends thereof to form one path; and
said thermal flow sensor is disposed in said one path and detects a total flow rate of the fluid running through the branch paths.

9. The fluid detecting device according to claim 8, wherein an end portion of said one path is open toward a surrounding environment of said main path.

10. The fluid detecting device according to claim 7, wherein each of said branch paths comprises another end portion which is open toward a surrounding environment of said main path.

11. The fluid detecting device according to claim 7, further comprising an auxiliary thermal flow sensor, which is positioned at a location where said branch paths are not formed, and which detects a state of said fluid.

12. A fluid detecting device comprising:
a main path through which a fluid runs;
at least one branch path, each of which: (i) comprises an inflow-side opening end portion pointed toward an upstream side of said main path and an outflow-side opening end portion pointed toward a downstream side of said main path which are formed in the vicinity of an inner wall surface of the main path, and (ii) causes part of a fluid flowing in the vicinity of the inner wall surface of said main path to run therethrough via said inflow-side and outflow-side opening end portions; and
at least one thermal flow sensor that detects a flow of the fluid running through said branch path.

13. The fluid detecting device according to claim 12, wherein the fluid detecting device comprises a plurality of said branch paths, the inflow-side opening end portions of said plurality of branch paths are arranged at regular intervals around an axis of said main path in a cross-section of said main path, and the outflow-side opening end portions of said plurality of branch paths are arranged at regular intervals around the axis of said main path in a cross-section of said main path.

14. The fluid detecting device according to claim 13, wherein:
said plurality of branch paths comprises: (i) a plurality of upstream-side branch paths provided with said inflow-side opening end portions, respectively, (ii) a plurality of downstream-side branch paths provided with said outflow-side opening end portions, respectively, and (iii) a communicating portion, which is disposed between said plurality of upstream-side branch paths and said plurality of downstream-side branch paths, and which forms one path; and
said thermal flow sensor is disposed in the communicating portion and detects a total flow rate of the fluid running through said branch paths.

15. The fluid detecting device according to claim 14, wherein a path resistance of each of said branch paths is greater than a path resistance of said communicating portion.

16. The fluid detecting device according to claim 12, wherein the fluid detecting device comprises a plurality of said branch paths, and the inflow-side opening end portions of the plurality of branch paths are approximately aligned with the respective outflow-side opening end portions in a path direction of said main path.

17. The fluid detecting device according to claim 16, wherein:
said plurality of branch paths comprises: (i) a plurality of upstream-side branch paths provided with said inflow-side opening end portions, respectively, (ii) a plurality of downstream-side branch paths provided with said outflow-side opening end portions, respectively, and (iii) a communicating portion, which is disposed between said plurality of upstream-side branch paths and said plurality of downstream-side branch paths, and which forms one path; and
said thermal flow sensor is disposed in the communicating portion and detects a total flow rate of the fluid running through said branch paths.

18. The fluid detecting device according to claim 17, wherein a path resistance of each of said branch paths is greater than a path resistance of said communicating portion.

19. The fluid detecting device according to claim 12, further comprising an auxiliary thermal flow sensor, which is positioned at a location where said branch paths are not formed, and which detects a state of said fluid.

20. The fluid detecting device according to claim 19, wherein said auxiliary thermal flow sensor is disposed in a fluid-pooling portion that communicates with said branch paths.

* * * * *